United States Patent [19]

Swanic

[11] Patent Number: 4,965,856
[45] Date of Patent: Oct. 23, 1990

[54] SECURE OPTICAL-FIBER COMMUNICATION SYSTEM

[75] Inventor: Anthony Swanic, Las Vegas, Nev.

[73] Assignee: Arbus Inc., Las Vegas, Nev.

[21] Appl. No.: 355,460

[22] Filed: May 23, 1989

[51] Int. Cl.⁵ ............................................ H04B 10/00
[52] U.S. Cl. ...................................... 455/617; 370/3; 340/555; 379/35
[58] Field of Search ............... 455/617; 340/555; 556; 340/557; 370/3; 379/35

[56] References Cited

U.S. PATENT DOCUMENTS

| | | | |
|---|---|---|---|
| 4,207,561 | 6/1980 | Steensma | 455/612 |
| 4,435,850 | 3/1984 | Bowen et al. | 340/555 |
| 4,591,709 | 5/1986 | Koechner et al. | 340/555 |
| 4,628,501 | 12/1986 | Loscoe | 370/3 |
| 4,632,515 | 12/1986 | Stowe et al. | 350/320 |
| 4,636,029 | 1/1987 | Johansson et al. | 340/555 |
| 4,887,313 | 12/1989 | Luke et al. | 455/617 |

*Primary Examiner*—Herbert Goldstein
*Assistant Examiner*—Geoff Sutcliffe
*Attorney, Agent, or Firm*—William A. Knox

[57] ABSTRACT

A data signal and a reference signal are multiplexed into a fiber optic communications link for transmission from a first secure location to a seond location. A replica of the reference signal is transmitted from the first location to the second location over a separate communication channel. At the second location, the angular phase difference between the reference signal and the replica thereof is continuously monitored. If the angular phase difference departs significantly from a specified value, an alarm is set as a warning that the fiber optic communications link has been compromised.

17 Claims, 1 Drawing Sheet

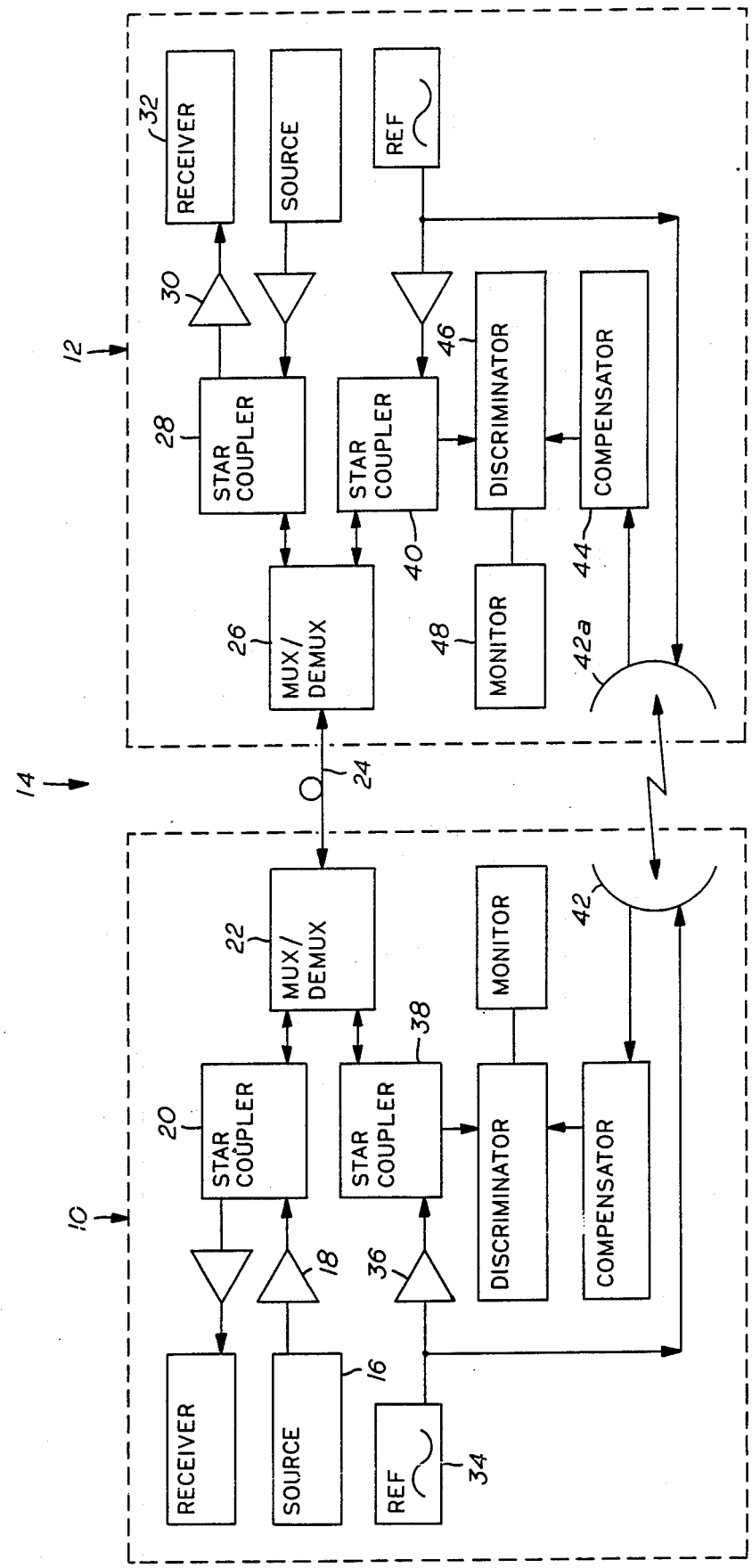

SECURE OPTICAL-FIBER COMMUNICATION SYSTEM

BACKGROUND OF THE INVENTION

1. Field of the Invention

This invention is concerned with monitoring the security of a fiber optic communication system and with providing an alarm signal in the event of unauthorized eavesdropping thereon.

2. Discussion of the Prior Art

The advantages of optical fiber communication links are well known. Modern optical waveguides offer a low attenuation rate per kilometer, high data-transmission rates and a substantial bandwidth. The optical fibers are virtually free from electromagnetic interference and from radiation effects. Several channels of information may be transmitted bidirectionally over a single waveguide by wavelength-division multiplexing (WDM) techniques. A typical such system is taught by U.S. Pat. No. 4,628,501, issued 12/09/89 in the name of Claire E. Loscoe.

Although fiber optic systems are relatively more secure to surreptitious tapping than are wire lines, they can be compromised. Typically, in fiber optic communication links, an optical fiber and its cladding are coated with a compliant material that acts as a buffer against random environmental microbending and other mechanical distortions. Preferably, the coating may have a relatively hard outer shell and a soft inner layer. An evil-doer, intent on invading the communication system, would be obliged to penetrate a portion of the the buffer coating and to flex the fiber in such a manner as to couple the signals out of the fiber and into an evanescent coupler. That act will cause a phase shift of a data-modulated optical carrier signal propagating through the optical fiber. One method for making such a tap is disclosed in U.S. Pat. No. 4,632,513, issued in the name of D. W. Stowe et al.

It is the purpose of this invention to provide means for continuously monitoring the phase angle of a datamodulated optical carrier signal as measured relative to a reference signal and to sound an alarm if the measured relative phase angle departs significantly from a specified minimum.

SUMMARY OF THE INVENTION

In accordance with this invention, I provide a system for alerting a user that a fiber optic communication system has been compromised. The system includes, at a first location, a source of data signals and a means for modulating a first optical carrier signal by the data signals. A reference signal is generated for modulating a second optical carrier signal. The first and second modulated carrier signals are wavelength-division-multiplexed into a single fiber optic communications link that interconnects the source of data signals at the first location with a data-signal receiver at a second location. At the receiver location, the first and second modulated carrier signals are demultiplexed and demodulated to recover the data and reference signals. A replica of the reference signal is sent to the receiver location over a separate communications channel. The data-signal receiver includes a phase discriminator for measuring the difference in phase angle between the reference signal as received over the fiber optic communications link and the replica of the reference signal as received over the separate communication channel such as a telemetric link. An alarm signal is generated if the angular phase difference becomes non-zero.

In accordance with an aspect of this invention, a phase compensator is coupled to the phase discriminator for equalizing the effective path-length differences between the fiber optic communications link and the separate communication channel.

BRIEF DESCRIPTION OF THE DRAWING

The benefits and advantages of this invention will be better appreciated by reference to the detailed description of the preferred embodiment and to the sole drawing which illustrates schematically the full duplex fiber optic communication system of my invention.

DETAILED DESCRIPTION OF THE PREFERRED EMBODIMENT

The sole FIGURE shows a duplex fiber optic communications link between two locations 10 and 12. Although locations 10 and 12 may be presumed to be secure, the region, 14, between the two locations is open and without protection. The system in the FIGURE is bidirectional (full duplex). For simplicity of explanation however, it will be assumed that location 10 collectively constitutes a data source and that location 12 collectively constitutes a data receiver.

A data source 16 provides a data signal, which may be analog or digital, through a buffer amplifier 18, to modulate the output of a light emitting diode (LED) that is incorporated into a star coupler 20 of any well-known type. See, for example, the '501 patent, previously cited. The LED provides a first optical carrier signal, preferably characterized by a wavelength on the order of 1300 nanometers (nm). The modulated carrier signal is fed into WDM multiplexer/demultiplexer (M/D) 22, of any commercial type such as is made by Gould Inc. of Glen Burnie MD. The output of WDM M/D 22 is sent to an identical WDM M/D, 26, over optical fiber 24. Optical fiber 24 may be preferably of the double window type, such as CORGUIDE ® made by Corning Glass Works of Corning, N.Y., having a core diameter of 50 $\mu$m and a composite strandable buffer covering of 500 $\mu$m in diameter. At M/D 26, the modulated carrier signal is demultiplexed and delivered to star coupler 28 where the modulated carrier signal is demodulated by a photo-detector that is a part of the star coupler, to recover the original data signal. The demodulated data signal is then sent to a signal utilization device 32 via buffer amplifier 30.

A reference signal generator 34 provides an analog CW signal in the UHF range such as 0.5 GHz. A first portion of the reference signal is sent to star coupler 38 via buffer amplifier 36. The reference signal modulates the light output of an LED in star coupler 38 to provide a second modulated carrier signal characterized by a wavelength on the order of 800 nm. The second modulated carrier signal is multiplexed into optical fiber 24 along with the first datamodulated carrier signal for transmission to second location 12. At the receiver location 12, the second modulated carrier signal is demultiplexed by M/D 26 and demodulated by a photodetector in star coupler 40 to recover the original reference signal.

A second portion of the analog reference signal is tapped off from the reference signal generator 34 at the source location 10, and is transmitted by a separate communication channel to receiver 12. The separate communication channel may be any desired type of telemetric link such as a wire line, a coaxial cable, an ethereal microwave link or another optical fiber system. In the FIGURE, by way of example only, the separate communication channel is shown symbolically as a microwave link having antennas 42 and 42a but it need not be so. At receiver location 12, the second portion of the reference signal is fed to a phase compensator 44 and thence to one input of a phase discriminator 46. The other input to phase discriminator 46 receives the first portion of the reference signal that was recovered from the demultiplexed, demodulated second optical carrier signal. In effect, the second portion of the reference signal is a replica of the first portion thereof.

In my presently preferred mode of operation, when the system is first activated, it must be calibrated. In phase discriminator 46, the first portion of the reference signal as received over the fiber optic communications link is compared with the replica, that is, with the second portion of the reference signal as received over the separate communications channel. Phase discriminator 46 may be a 2A0757 module such as is furnished by Anaren Microwave Inc. of Syracruse, N.Y. By means of phase compensator 44, the angular phase difference between the two received portions of the reference signal, as measured by phase discriminator 46, is set to zero. Phase compensator 44 may be an analog phase compensation network of any well known type or it could be digitally implemented. The purpose of the initial phase compensation is to correct for the effective signal path-length differences and phase distortion effects that necessarily exist between the two types of communication media, i.e., the fiber optic communication link and the separate communication channel. I have found that once the two portions of the reference signal have been properly zeroed out, long-term relative drift between the signals is minimal.

Once the system has been calibrated and in routine operation, both the data signals and the first portion of the reference signal are multiplexed into the optical fiber communication link 24 as previously described. The second portion of the reference signal is transmitted over the physically separate communications channel. A monitoring unit 48 maintains continuous surveillance over the output of phase discriminator 46. Monitoring unit 48 may be any convenient device such as a computer. An alarm is incorporated with unit 48. If the monitoring unit 48 discovers that the output of phase discriminator 46 should depart significantly from a specified minimum angular phase shift such as zero, an alarm is sounded indicating that the fiber optic communications link may have been invaded.

I have found that tapping of any portion of a fiber optic link will cause a relative phase shift of at least 20 to 30 degrees between the first and second optical carrier signals. Therefore, if the optical fiber communications link is tapped, the phase discriminator will detect an abrupt relative phase shift between the two portions of the reference signal as received over the two separate channels. Even if a malefactor attempted to tamper with the separate telemetric link, in an effect to compensate for the disturbance created in the fiber optic communications link by the tap, there would necessarily be an inherent time delay between the two operations. In the interim, the security monitor would have sounded the alarm.

In the description supra, we have assumed for simplicity that the system is a one-way system. Since the system is a duplex circuit, it works in an identical fashion in both directions; that is, locations 10 and 12 can be interchanged. Two-way data transmission can take place simultaneously because of wavelength division multiplexing.

One source and one receiver have been shown. It will be apparent to those skilled in the art that more than one source-receiver pair may be embraced by the security monitoring system and that variations in the design and operation of the system may be conceived but which will fall within the scope and spirit of this disclosure which is limited only by the appended claims.

I claim as my invention:

1. A system for alerting a user to the fact of an unauthorized tapping of an optical fiber communication system, comprising:
    a means for generating data signals;
    means for modulating a first optical carrier signal with said data signals;
    means for providing a reference signal;
    means for modulating a second optical carrier signal by said reference signal;
    means for multiplexing the first and second modulated optical carrier signals into a fiber optic communication link;
    means, coupled to said fiber optic communications link, for receiving, demultiplexing and demodulating the first and second modulated optical carrier signals to recover the data and reference signals;
    means for providing a replica of said reference signal;
    means for measuring the phase difference between the recovered reference signal and the replica of said reference signal as received over a communications link that is physically separate from said fiber optic communication link, there being an effective path-length difference therebetween; and
    means for creating an alert signal when the measured phase difference between the recovered reference signal and the received replica of the reference signal becomes non-zero.

2. The system as defined by claim 1, wherein:
    the first and second optical carrier signals are characterized by first and second wavelengths respectively; and
    the multiplexing and demultiplexing means provide wavelength-division multiplexing and demultiplexing capabilities.

3. The system as defined by claim 2, further comprising:
    a phase compensating means, coupled to the phase difference measuring means, for equalizing the effective path-length difference between the fiber optic communications link and the physically separate communication link.

4. A method for detecting unauthorized eavesdropping on a fiber optic communications link, comprising:
    at a first location, generating a data signal;
    modulating a first optical carrier signal by said data signal;
    generating a reference signal;
    modulating a second optical carrier signal by said reference signal;
    multiplexing the first and second modulated optical carrier signals into a fiber optic communications link and transmitting said first and second modulated optical carrier signals to a second location;
    transmitting a replica of said reference signal to said second location;

at said second location, receiving and demodulating the first and second modulated optical carrier signals, receiving the transmitted replica of said reference signal and measuring the angular phase difference between the received replica of said reference signal and the demodulated second modulated optical carrier signal; and generating an alarm signal when the measured angular phase difference becomes non-zero.

5. The method as defined by claim 4, wherein:
said first and second optical carrier signals are characterized by first and second wavelengths.

6. The method as defined by claim 5, wherein:
the first and second modulated optical carrier signals are respectively multiplexed and demultiplexed by use of wavelength-division multiplexing technology.

7. The method as defined by claim 6, comprising the step of:
transmitting the replica of the reference signal over a communications channel that is physically separate from the fiber optic communication link.

8. The method as defined by claim 7, comprising the step of:
compensating for the phase difference between an reference signal and the replica thereof due to the effective signal path-length difference presented by the reference signal communcations channel and the fiber optic communication link.

9. A system for monitoring signal security in a fiber-optic communication system, comprising:
a transmitter, the transmitter including at least
(a) means for generating a data signal,
(b) means for modulating a first optical carrier signal by said data signal,
(c) means for generating a UHF reference signal,
(d) means for modulating a second optical carrier signal by a first portion of said reference signal,
(e) means for multiplexing the first and second modulated optical carrier signals into a fiber optic communications link;
a receiver, the receiver being interconnected with said transmitter by said fiber optic communications link;
a telemetric link interconnecting said transmitter with said receiver, said telemetric link being adapted to transfer a second portion of said reference signal from said transmitter to said receiver;
said receiver including at least
(f) means for demultiplexing said first and second modulated optical carrier signals received over said fiber optic communications link,
(g) means for demodulating the demultiplexed first and second modulated optical carrier signals,
(h) a signal utilization device for receiving the data signals extracted from the demodulated first optical carrier signal,
(i) a phase discriminator for receiving as inputs, the first portion of the reference signal, as extracted from the demodulated second carrier signal, and the second portion of said reference signal as received over said telemetric link, and
(j) means for providing an alarm signal when the two inputs become out of phase with each other.

10. The communications security monitoring system as defined by claim 9, comprising:
means included with said receiver for compensating for the phase difference between the first and second portions of the reference signal, due to an effective signal path-length difference of the fiber optic communication link and the telemetric link.

11. The communications security monitoring system as defined by claim 9, wherein:
the first and second optical carrier signals are characterized by first and second wavelengths; and
said multiplexing and demultiplexing means are wavelength-division multiplexers/demultiplexers.

12. The communications security monitoring system as defined by claim 9, wherein:
said transmitter and receiver are configured as a full duplex communications system.

13. The communications security monitoring system as defined by claim 9, wherein:
the telemetric link is physically separate from the fiber optic communications link.

14. The communications security monitoring system as defined by claim 9, wherein:
the telemetric link is a wire-line.

15. The communication security monitoring system as defined by claim 9, wherein:
the telemetric link is ethereal.

16. The communications security monitoring system as defined by claim 12 wherein:
the system comprises a full duplex communications system.

17. In a communication network including at a first location, a transmitter of data signals and at a second location, a receiver of data signals, the two locations being interconnected by a fiber optic communications link, a security monitoring system, comprising:
means for modulating a first optical carrier signal of a first wavelength by the data signals;
means for generating a reference signal;
means for modulating a second optical carrier signal of a second wavelength by said reference signal;
means for wavelength-division multiplexing the first and second modulated optical carrier signals into the fiber optic communication link;
means at the receiver location for receiving, demultiplexing and demodulating said first and second modulated optical carrier signals to recover the data and reference signals;
means for transmitting a replica of said reference signal over a telemetric link from said first location to said second location;
means for measuring the relative phase angle between the recovered reference signal and a received replica thereof; and
means for generating an alarm signal if the measured phase angle exceeds an excepted range of tolerance around zero degrees.

* * * * *